3,378,431
METHOD OF MAKING CARBON-CONTAINING GLASS AND PRODUCT THEREOF
Carlyle F. Smith, Jr., Rochester, and William B. Crandall, Fairport, N.Y., assignors to Pfaudler Permutit Inc., Rochester, N.Y., a corporation of New York
No Drawing. Continuation of application Ser. No. 347,354, Feb. 26, 1964. This application Mar. 20, 1967, Ser. No. 624,635
8 Claims. (Cl. 161—1)

ABSTRACT OF THE DISCLOSURE

A devitrification resistant bonded mass of vitreous $SiO_2$ and C physically inseparable and microscopically indistinguishable from silica and a method of making such a glass including the steps of heating to at least sintering temperature a glass-making composition of $SiO_2$ and a carbon-containing compound which will readily disassociate at a temperature below a selected elevated temperature to which the glass is heated, but not in excess of about 1250° C. leaving free carbon.

---

This application is a continuation application of our prior application Ser. No. 347,354, filed Feb. 26, 1964, and now abandoned.

This invention relates to a novel glass and method of making the same, particularly to a method of making devitrification-resistant glass having high thermal stability, high mechanical strength and other desirable properties rendering such glass suitable for many purposes, old and new.

The glass industry has long without success sought to find a devitrification-resistant glass which has good mechanical strength and high thermal stability having the equivalent desirable characteristics of vitreous silica.

Uncontrolled crystallization resulting from certain impurities and conditions during the usual process of making glass not only serves no useful purpose, but generally diminishes thermal stability and mechanical strength of the glass. It is the purpose of the present invention to provide a glass and method for making the same which avoids crystallization.

We have discovered that by heat treating, in an oxygen-free atmosphere, a glass-making composition of silica ($SiO_2$) and carbon (C) we are able to produce a devitrification-resistant glass composed of a mass of $SiO_2$ and C.

Our invention has the advantage of producing a glass having a higher thermal stability and a greater mechanical strength than known glasses having impurities. Our invention yields a glass having substantially the same mechanical strength as and greater thermal stability than pure vitreous silica and has greater resistance to devitrification than pure vitreous silica, thereby presenting a highly desirable end product.

Thus, it is one object of our invention to provide an improved glass and method for making the same which has a greater thermal stability than vitreous silica and greater mechanical strength than known multicomponent glasses and having greater devitrification-resistance than pure vitreous silica while possessing the strength and thermal stability of vitreous silica.

Heat transfer properties are important physical characteristics of ceramic materials. Thermal shock resistance is related directly to thermal diffusivity. It has long been known that the thermal diffusivity of most glass is low but takes a sudden upswing due to the effects of radiation at temperatures above the range of 400° C. to 500° C. There has long been a need for a glass which also has a low transmission of radiation or thermal diffusivity. We have discovered that our glass possesses such a desirable characteristic.

Therefore, it is a further object of our invention to provide a glass having improved thermal diffusivity characteristics.

It is a general object of our invention to provide an improved glass and method of making the same.

Other objects and advantages of this invention will be particularly set forth in the claims and will be apparent from the following description.

Basically, our process comprises reacting carbon (C) and silica ($SiO_2$) by sufficiently heating in an oxygen-free atmosphere and thereafter cooling to form a bonded mass of devitrification-resistant carbon-containing glass comprising $SiO_2$ and C in which the carbon is physically inseparable and microscopically indistinguishable from silica. Our glass is black in color. Preferably, the reaction takes place under pressure so that the end product is a dense mass of glass. A glass-making composition comprising carbon-containing compounds which readily disassociate at elevated temperatures preferably below fusion temperature of the glass-making composition leaving free carbon suitably dispersed around discrete particles of silica ($SiO_2$), is heat treated, preferably while being densified, as for example, by "hot-pressing." "Hot-pressing" is a process known in the ceramic art by which compaction and sintering are utilized simultaneously, to in this case, densify the carbon and silica into a homogeneous mass. The heat treating and densification is carried out in an oxygen-free atmosphere (can be carried out in an atmosphere of inert gas) so that the carbon will not combine with oxygen but will be densified with the $SiO_2$.

By way of illustrating our invention, we shall now compare the results of hot-pressing pure finely ground colloidal silica powder ($SiO_2$) without addition (hereinafter referred to as Powder No. 1) and pure finely ground colloidal silica powder ($SiO_2$) of subsieve size in the order of 10 millimicrons with 33% by weight carbon containing compounds such as "Carbowax" (a hydrocarbon and wax mixture) (hereinafter referred to as Powder No. 2), preferably being evenly dispersed.

The hot-pressing densification of Powder No. 1 is carried out in a graphite bar-mold in which the glass-making composition is heated to a temperature in the range of 1000° C. to 1150° C. as determined by a thermocouple inserted in the mold approximately one-half inch away from the hot-pressing cavity. Hot pressing Powder No. 1 results in an end product after cooling of a devitrified glass having cristobalite inclusions as determined by X-ray diffraction of the powdered end product. Experimentation has proved that with increased temperature during hot-pressing of the Powder No. 1, devitrification increases.

Powder No. 2 was heated in an oxygen-free atmosphere in a graphite bar mold to a temperature of 1050° C., then pressure of 2,000 p.s.i. (pounds per square inch) was applied to the composition and while under pressure the temperature of the composition was elevated to 1150° C. and held there for a half-hour. The end result after cooling was a black, vitreous, opaque, dense mass of highly devitrification-resistant glass with conchoidal fracture having substantially the same mechanical strength as and greater thermal stability than pure vitreous silica. When the Powder No. 2 end product was pulverized and tested under X-ray diffraction, there was no cristobalite or other crystalline material present. Tests showed the presence of 1.2% by weight of carbon present in the dense glass.

We have observed that the Powder No. 1 is densified to a clear glass at 1000° C. under 2,000 p.s.i. pressure, whereas the Powder No. 2 could not be easily densified below 1150° C. and 2,000 p.s.i. pressure.

Devitrification does not appear in the glass formed by hot-pressed Powder No. 2 until hot-pressing temperatures reach 1250° C. and higher. Moreover, it is significant that devitrified portions of the hot-pressed Powder No. 2 are not in the form of massive inclusions even at such elevated temperatures as in the case of hot-pressed Powder No. 1. Hence, the carbon impedes the growth of crystal nuclei which otherwise grow quite rapidly in pure fused silica once they are formed. X-ray diffraction investigations of devitrified material in the end product of Powder No. 2 resulting from hot-pressing above 1250° C. is cristobalite.

Heat transfer in solids may be due to two processes, conduction and radiation. With a random structure there is a high thermal resistance which in turn leads to a low thermal conductivity. For transparent or translucent glasses such as pure vitreous silica this holds true only up to 400° C. to 500° C. At temperatures within and above this range, the effects of radiation cause the thermal transmissivity to rise sharply. The more transparent and simpler in composition the glass, the higher the radiation conductivity because of the lower radiation absorption. With opaque bodies, most of the radiation is absorbed at temperatures below 1000° C.

The calculated diffusivity of our glass shows that the radiation conductivity of this glass to be below that of clear fused silica. The thermal transmissivity of our glass does not increase appreciably up to 700° C. at which temperatures there is a sharp rise corresponding to the sharp rise at 400° C. to 500° C. in pure vitreous silica.

As illustrative of the higher thermal stability of our devitrification-resistant glass composed of a dense mass of silica and carbon, we submitted samples of both hot-pressed Powder No. 1 and Powder No. 2 to the same quantity of heat generated by an oxy-acetylene flame until the fused silica formed by the Powder No. 1 was white hot at which stage the fused silica could easily be drawn into a fiber whereas under the same conditions our devitrification-resistant glass of silica and carbon could not be drawn or otherwise easily deformed.

When finely powdered, our No. 2 hot-pressed black colored glass exhibits translucency under a microscope. The refractive index of our glass in 0.3 micron light is the same as that of fused silica produced from the Powder No. 1. The elastic moduli, as determined by sonic method, is the same for the hot-pressed glass manufactured from both the Powders No. 1 and No. 2. We have also successfully produced our glass by compacting the Powder No. 2 in a cold-pressing die and thereafter subjecting the compacted powder to heat-treatment in an oxygen-free atmosphere to a temperature of 1200° C.

The Powder No. 2 was compacted in a bar mold at pressures up to 2,000 p.s.i. The cold-pressed bar was then heat treated for periods of time up to twelve hours in a furnace having an argon atmosphere or in an evacuated tube. The sintered end product has the same appearance as our glass prepared by hot-pressing and upon testing had the same characteristics described above.

Thus, by our invention, we are able to produce a glass of greater devitrification-resistance and having a greater viscosity than pure vitreous silica, but which has the same elastic and strength properties and greater thermal stability.

While we have described the preferred form of our invention it will be apparent that various modifications and changes may be made therein, without departing from the spirit of our invention as set forth in the appended claims.

We claim:

1. A method of making glass comprising the steps of: heating to a selected elevated temperature of at least sintering temperature a glass-making composition of $SiO_2$ and a carbon-containing compound which will readily disassociate at a temperature below said temperature but not in excess of about 1250° C. leaving free C; said heating being carried out in an oxygen-free atmosphere; and cooling the heated composition thereby forming a mass of carbon-containing glass comprising $SiO_2$ and C.

2. A method in accordance with claim 1 in which said mass of carbon-containing glass comprises $SiO_2$ and C physically inseparable and microscopically indistinguishable from silica.

3. A method in accordance with claim 2 in which said selected elevated temperature is at least substantially 1050° C.

4. A method in accordance with claim 2 including a step of compacting said glass-making composition under pressure of at least substantially 2,000 p.s.i. before cooling.

5. A method of making glass comprising the steps of: compacting a glass-making composition comprising colloidal $SiO_2$ powder and a low melting carbon-containing compound which will readily disassociate at an elevated temperature below sintering temperature of the glass-making composition leaving free C; heating the said composition to an elevated temperature in the range of about 1050° C. to about 1250° C. in an oxygen-free atmosphere under pressure of at least substantially 2,000 p.s.i. until it sinters; and cooling the compacted sintered composition thereby forming a dense mass of carbon-containing glass comprising $SiO_2$ and C physically inseparable and microscopically indistinguishable from silica.

6. A devitrification resistant carbon-containing glass comprising a bonded mass of vitreous $SiO_2$ and C physically inseparable and microscopically indistinguishable from silica made by the process of claim 5.

7. A method in accordance with claim 5 in which the carbon-containing compound is a hydrocarbon wax.

8. A devitrification resistant carbon-containing glass containing vitreous $SiO_2$ and C physically inseparable and microscopically indistinguishable from silica made by the method of claim 1.

References Cited

UNITED STATES PATENTS

| | | | |
|---|---|---|---|
| 2,556,616 | 6/1951 | Ellis | 252—506 X |
| 2,956,327 | 10/1960 | Borel et al. | 62—32 |
| 3,116,137 | 12/1963 | Vasilos et al. | 65—18 X |
| 3,338,694 | 8/1967 | Davy | 65—32 |

OTHER REFERENCES

"Silicon Carbide," a High Temperature Semiconductor, 1960, Pergamon Press; Proceedings of the Conference on Silicon Carbide, Boston, Mass., April 2–3, 1959, pages 67 to 69.

DONALL H. SYLVESTER, *Primary Examiner.*

F. W. MIGA, *Assistant Examiner.*